United States Patent
Hickerson et al.

(10) Patent No.: US 10,528,352 B2
(45) Date of Patent: Jan. 7, 2020

(54) BLOCKING INSTRUCTION FETCHING IN A COMPUTER PROCESSOR

(71) Applicant: International Business Machines Corporation, Armonk, NY (US)

(72) Inventors: Bryan G. Hickerson, Cedar Park, TX (US); Sheldon Levenstein, Austin, TX (US); David S. Levitan, Austin, TX (US); Albert J. Van Norstrand, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 15/064,024

(22) Filed: Mar. 8, 2016

(65) Prior Publication Data
US 2017/0262286 A1   Sep. 14, 2017

(51) Int. Cl.
*G06F 9/38* (2018.01)
*G06F 9/30* (2018.01)
*G06F 12/0875* (2016.01)

(52) U.S. Cl.
CPC ........ *G06F 9/3802* (2013.01); *G06F 9/30043* (2013.01); *G06F 9/30054* (2013.01); *G06F 12/0875* (2013.01); *G06F 2212/452* (2013.01)

(58) Field of Classification Search
CPC .............. G06F 9/3802; G06F 9/30043; G06F 9/30054; G06F 9/30079; G06F 9/30181
USPC ........................................................ 712/226
See application file for complete search history.

(56) References Cited

U.S. PATENT DOCUMENTS

| | | | |
|---|---|---|---|
| 5,329,621 A | 7/1994 | Burgess et al. | |
| 5,987,539 A | 11/1999 | Goodrum | |
| 6,647,487 B1 | 11/2003 | Undy et al. | |
| 7,103,757 B1* | 9/2006 | Kashyap | G06F 9/30181 712/207 |
| 8,065,504 B2 | 11/2011 | Yates, Jr. et al. | |
| 2002/0087840 A1* | 7/2002 | Kottapalli | G06F 9/3851 712/219 |
| 2003/0084273 A1* | 5/2003 | Moore | G06F 9/30003 712/227 |
| 2004/0216101 A1 | 10/2004 | Burky et al. | |

(Continued)

OTHER PUBLICATIONS

Bucy et al., "The DiskSim Simulation Environment Version 4.0 Reference Manual (CMU-PDL-08-101)", Parallel Data Laboratory, Research Centers and Institutes, URL: http://repository.cmu.edu/pdl, dated May 2008, 95 pages, Carnegie Mellon University.

(Continued)

*Primary Examiner* — Aimee Li
*Assistant Examiner* — William V Nguyen
(74) *Attorney, Agent, or Firm* — Nathan M. Rau

(57) ABSTRACT

Blocking instruction fetching in a computer processor, includes: receiving a non-branching instruction to be executed by the computer processor; determining whether executing the non-branching instruction will cause a flush; and responsive to determining that executing the non-branching instruction will cause a flush, disabling instruction fetching for the computer processor for a time, including recoding the instruction such that the recoded instruction will be interpreted by an instruction fetch unit as an unconditional branch instruction.

15 Claims, 6 Drawing Sheets

(56) References Cited

U.S. PATENT DOCUMENTS

| | | | |
|---|---|---|---|
| 2006/0101238 A1* | 5/2006 | Bose | G06F 9/3802 |
| | | | 712/206 |
| 2008/0162907 A1* | 7/2008 | Luick | G06F 12/0862 |
| | | | 712/237 |
| 2011/0179254 A1* | 7/2011 | Yip | G06F 9/3851 |
| | | | 712/205 |
| 2013/0305094 A1* | 11/2013 | Hopley | G06F 11/3624 |
| | | | 714/38.1 |
| 2014/0208039 A1 | 7/2014 | Gilbert | |
| 2015/0067662 A1* | 3/2015 | Palalau | G06F 8/4441 |
| | | | 717/160 |

OTHER PUBLICATIONS

Batcher, "Cache Miss Reduction Techniques for Embedded CPU Instruction Caches", A Dissertation Submitted to Kent State University, dated May 2008, 134 pages.

* cited by examiner

BLOCKING INSTRUCTION FETCHING IN A COMPUTER PROCESSOR

BACKGROUND

Field of the Invention

The field of the invention is data processing, or, more specifically, methods, apparatus, and products for blocking instruction fetching in a computer processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern computing systems include computer processors that have registers that can be used to store data utilized by the processor. On occasion, a flush may occur and possibly cause registers to be restored to a previous state. In some processors, as the amount of information that must be flushed and restored grows, the overhead required to recover from a flush also grows.

SUMMARY

Methods, computer processors, and systems for blocking instruction fetching in a computer processor, including: receiving a non-branching instruction to be executed by the computer processor; determining whether executing the non-branching instruction will cause a flush; and responsive to determining that executing the non-branching instruction will cause a flush, disabling instruction fetching, including recoding the instruction such that the recoded instruction will be interpreted by an instruction fetch unit as an unconditional branch instruction.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION

Figure 1:
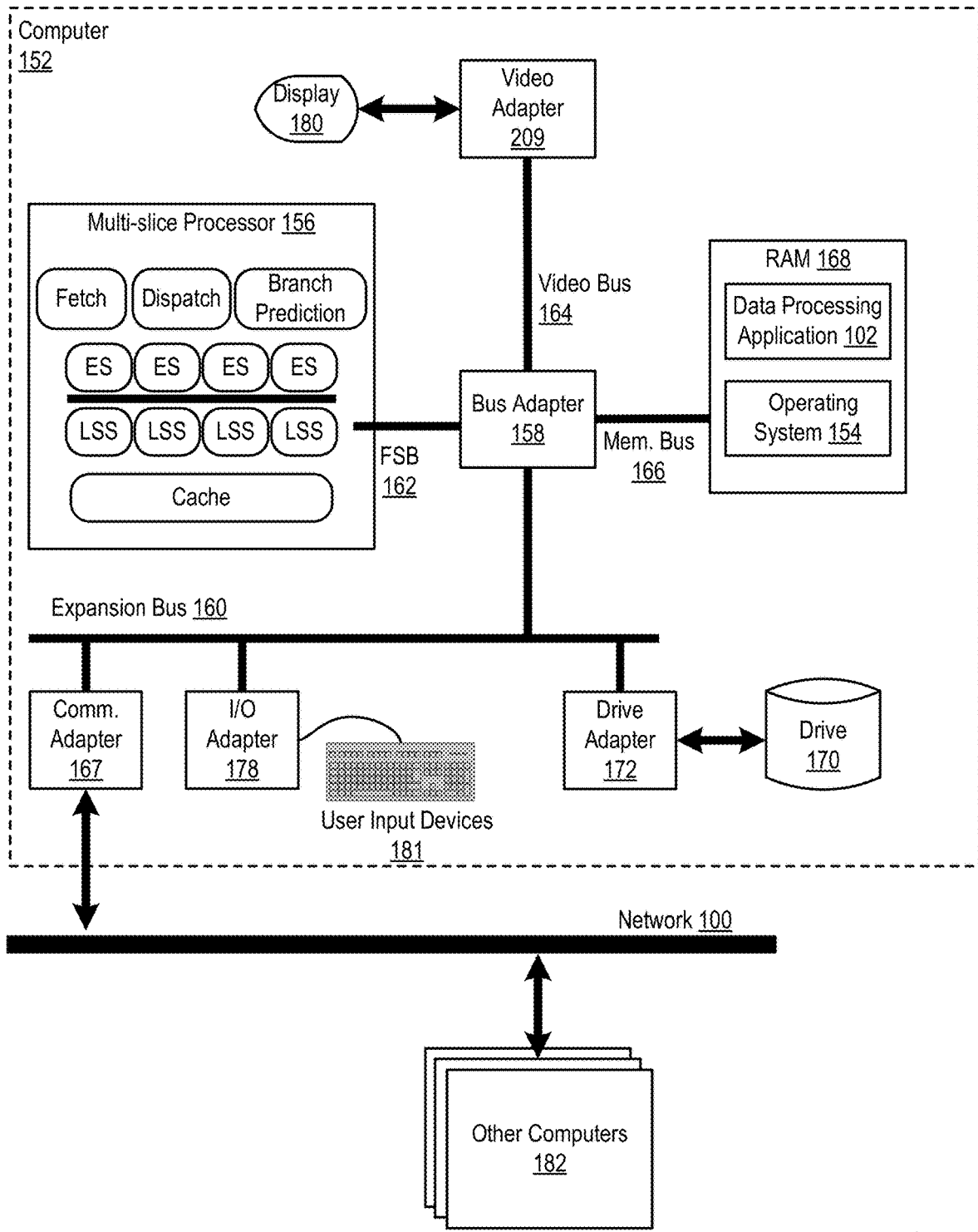
FIG. 1 sets forth a block diagram of an example system configured for blocking instruction fetching in a computer processor according to embodiments of the present disclosure.

Example methods, computer processors, and systems for blocking instruction fetching in a computer processor in accordance with the present disclosure are described with reference to the accompanying drawings, beginning with FIG. 1. FIG. 1 sets forth a block diagram of an example system configured for blocking instruction fetching in a computer processor according to embodiments of the present disclosure. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS'). Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for blocking instruction fetching in a computer processor according to embodiments of the present disclosure include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for blocking instruction fetching in a computer processor according to embodiments of the present disclosure include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for blocking instruction fetching in a computer processor according to embodiments of the present disclosure include modems for wired dial-up communications, Ethernet (IEEE 802.3) adapters for wired data communications, and 802.11 adapters for wireless data communications.

The arrangement of computers and other devices making up the example system illustrated in FIG. 1 are for explanation, not for limitation. Data processing systems useful according to various embodiments of the present disclosure may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present disclosure may be implemented on a variety of hardware platforms in addition to those illustrated in FIG. 1.

Figure 2:
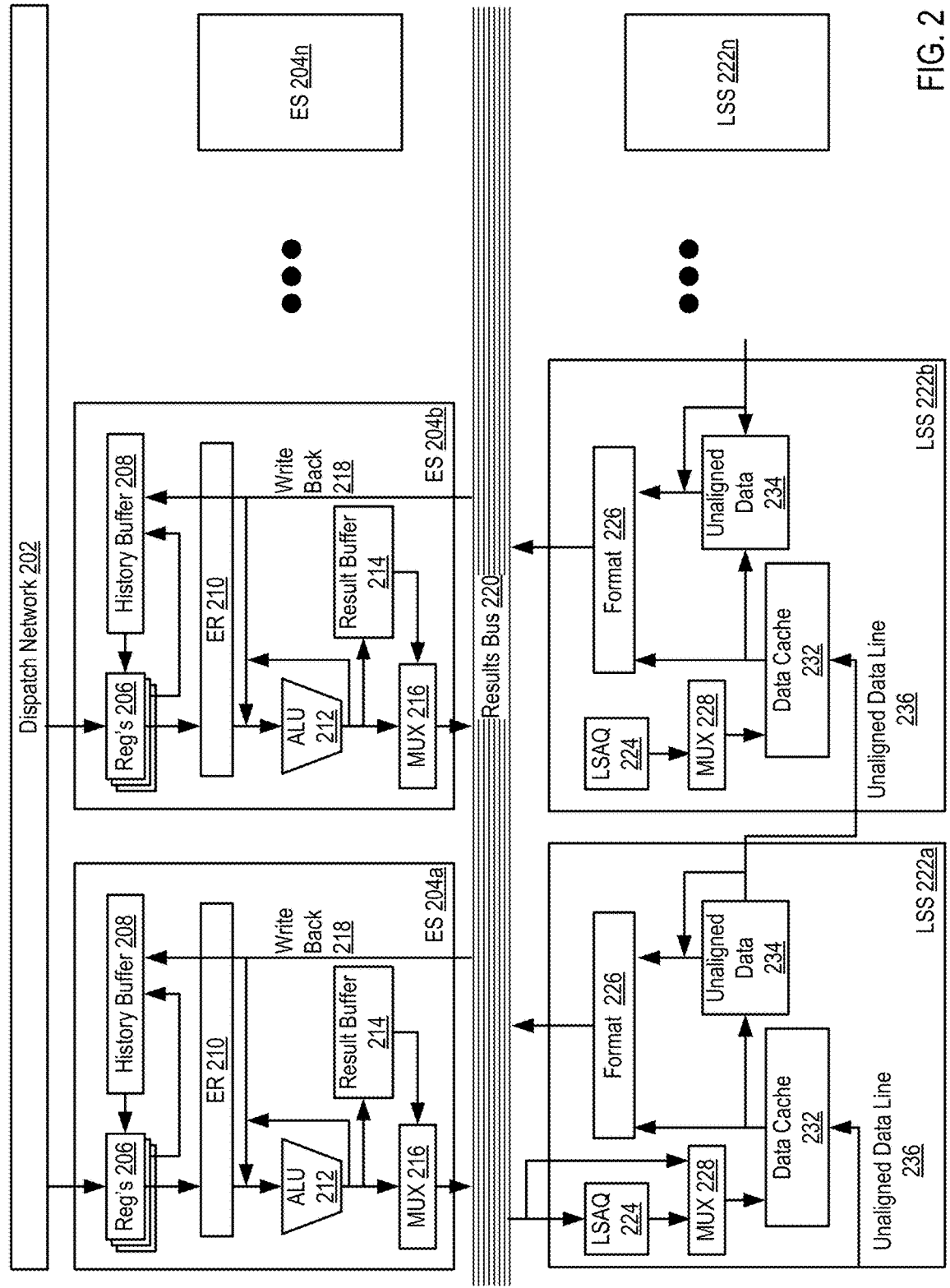
FIG. 2 sets forth a block diagram of a portion of a multi-slice computer processor according to embodiments of the present disclosure.

For further explanation, FIG. 2 sets forth a block diagram of a portion of a multi-slice processor, also referred to as a multi-slice computer processor, according to embodiments of the present disclosure. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store a tag for the youngest instruction directed to a particular logical register and the result of the execution of the instruction. A logical register is an abstraction of an architected register that enables out-of-order execution of instructions that target the same architected register, where the architected register may be embodied as a register number that is coded into the instruction.

When a younger instruction directed to the same particular logical register is received, the entry in the general purpose register is moved to the history buffer. The history buffer (208) may be configured to store tags for many instructions directed to the same logical register. That is, the general purpose register is generally configured to store the tag for a single, youngest instruction for each logical register while the history buffer may store tags for many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit (212) or to a load slice (222a, 222b, 222c) via the results bus (220).

The arithmetic logic unit (212) depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220), such as the write back line (218). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus.

The multi-slice processor in the example of FIG. 2 also includes a number of load/store slices (222a, 222b-222n). Each load/store slice includes a queue (224), a multiplexer (228), a data cache (232), unaligned data logic (234) and formatting logic (226). The queue receives load and store operations to be carried out by the load/store slice (222).

The unaligned data logic (234) of each slice is coupled to the unaligned data logic of another slice through the unaligned data line (236). The unaligned data logic (234) enables data to be stored and retrieved across multiple load/store slices. The formatting logic (226) formats data into a form that may be returned on the results bus (220) to an execution slice as a result of a load instruction.

The multi-slice processor in the example of FIG. 2 may be configured for blocking instruction fetching according to embodiments of the present disclosure by: receiving a non-branching instruction to be executed by the computer processor; determining whether executing the non-branching instruction will cause a flush; responsive to determining that executing the non-branching instruction will cause a flush, disabling instruction fetching; determining whether a flush has occurred; responsive to determining that a flush has occurred, enabling instruction fetching; recoding the instruction such that the recoded instruction will be interpreted by an instruction fetch unit as an unconditional branch instruction; executing the recoded instruction; inserting an identifier within the recoded instruction that will be interpreted by the instruction fetch unit as an instruction to cease instruction fetching; and disabling instruction fetching only for a particular thread that will execute the non-branching instruction, as will be described in greater detail below.

Figure 3:
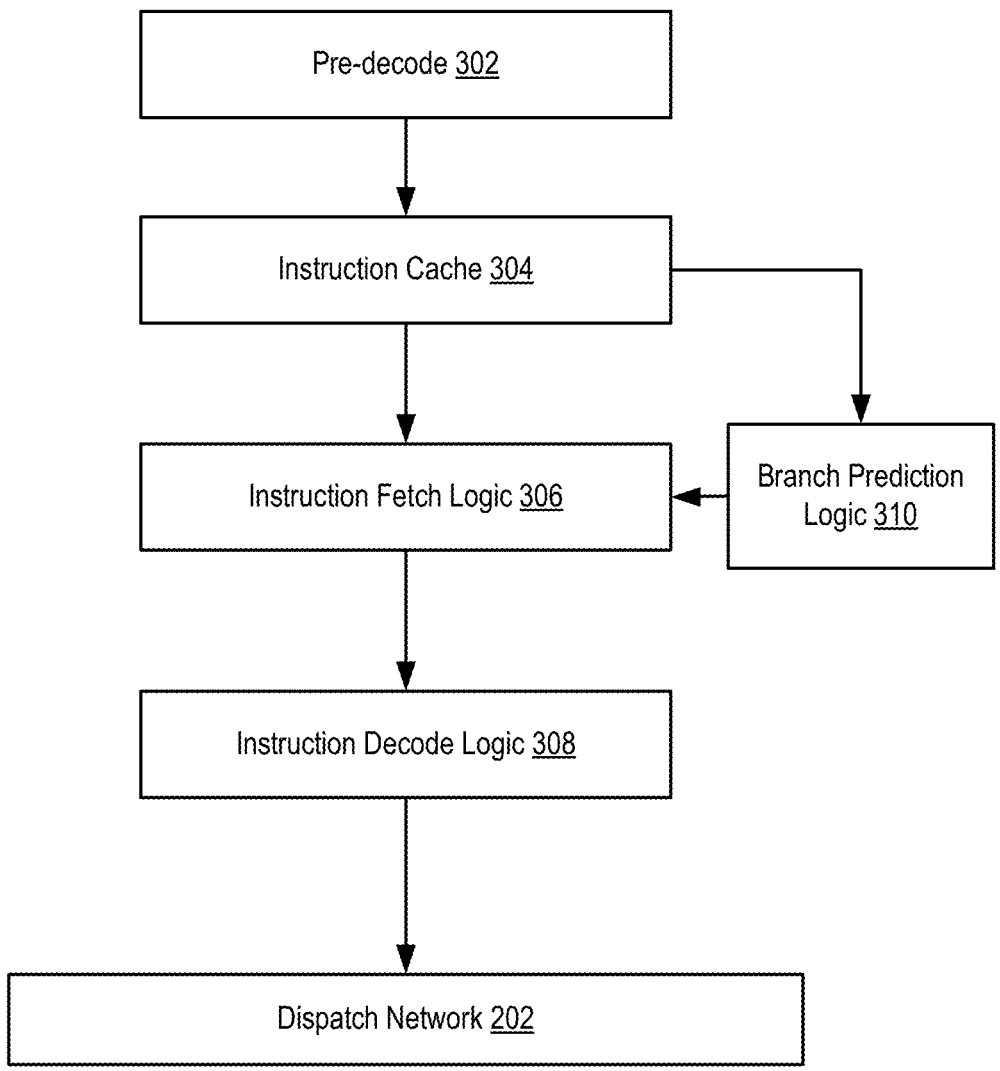
FIG. 3 sets forth a block diagram of another portion of a multi-slice computer processor according to embodiments of the present invention.

For further explanation, FIG. 3 sets forth a block diagram of another portion of a multi-slice processor according to embodiments of the present invention. The example multi-slice processor of FIG. 3 includes pre-decode logic (302) configured to retrieve instructions from memory, perform a preliminary decode of the instruction and store the pre-decoded instruction into an instruction cache (304).

The example multi-slice processor of FIG. 3 also includes branch prediction logic (310). Branch prediction logic generally performs branch prediction for pre-decoded instructions and tracks various branch predictors for executing and executed instructions. The branch prediction logic (310) may include or access various registers and storage that contain such branch predictors. Examples of storage entities may include global branch history tables and the like.

The example multi-slice processor of FIG. 3 also includes an instruction fetch unit (306). An instruction fetch unit (306) generally retrieves instructions from the instruction cache and provides the fetched instruction to instruction decode logic (308).

The example instruction decode logic (308) of FIG. 3 performs a final decode operation on the fetched instructions and provides the decoded instructions to the dispatch network (202). The dispatch network as described above, dispatches the decoded instructions among slices.

Figure 4:
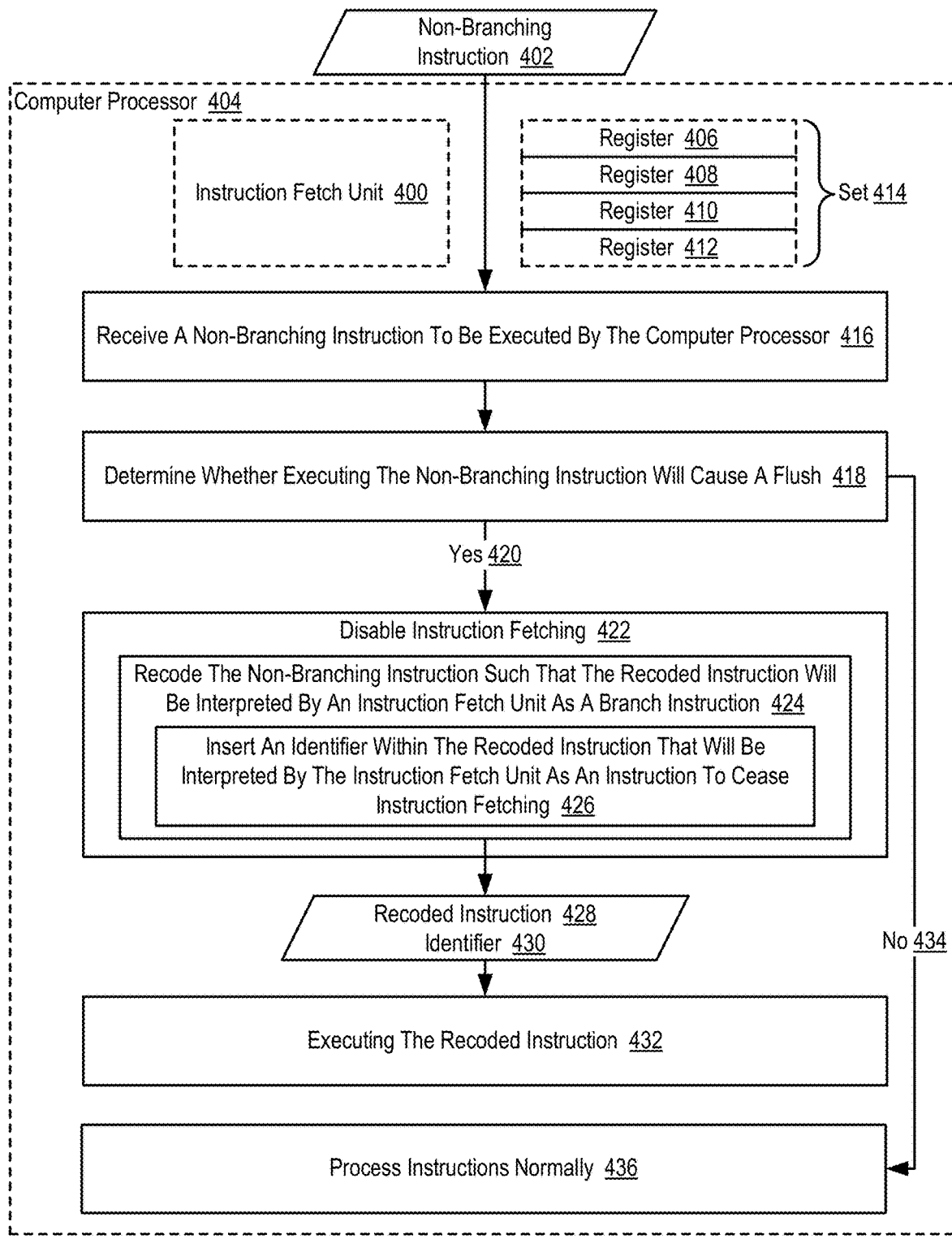
FIG. 4 forth a flow chart illustrating an example method for blocking instruction fetching in a computer processor according to embodiments of the present disclosure.

For further explanation, FIG. 4 sets forth a flow chart illustrating an example method for blocking instruction fetching in a computer processor (404) according to embodiments of the present disclosure. Although the computer processor (404) of FIG. 4 is depicted in less detail, readers will appreciate that the computer processor (404) may be a multi-slice computer processor similar to the processors described above with reference to FIG. 1 and FIG. 2.

The example method depicted in FIG. 4 includes receiving (416) a non-branching instruction (402) to be executed by the computer processor (404). A branch instruction may be embodied as an instruction that either conditionally or unconditionally branches to an address that is specified by the instruction, or specified in an address that is specified by the branch instruction. A non-branching instruction (402), as the term is used here, may be embodied as any instruction that is not a branch instruction. The computer processor (404) may receive (416) the non-branching instruction (402), for example, through the use of an instruction fetch unit that is included in the computer processor (404). Such an instruction fetch unit may be configured to fetch instructions from memory (not shown) and latch such instructions into an instruction register for subsequent execution by the computer processor (404). In the example method depicted in FIG. 4, receiving (416) a non-branching instruction (402) to be executed by the computer processor (404) may occur during instruction fetch.

The example method depicted in FIG. 4 also includes determining (418) whether executing the non-branching instruction (402) will cause a flush. Determining (418) whether executing the non-branching instruction (402) will cause a flush may be carried out at pre-decode, prior to decode and prior to fetch, when the instruction is first loaded into an instruction cache. As part of a flush, a set (414) of registers (406, 408, 410, 412) may be restored to a previous state. The set (414) of registers (406, 408, 410, 412) depicted in FIG. 4 may be embodied by a small units of storage that is available as part of the computer processor (404). The set (414) of registers (406, 408, 410, 412) may be addressed by mechanisms other than main memory and can be utilized to store data contained in main memory for quick access by the computer processor (404) when executing instructions.

In the example method depicted in FIG. 4, performing a flush may include restoring the set (414) of registers (406, 408, 410, 412) to a previous state. Such a restoration may be carried out by invalidating the data contained in the set (414) of registers (406, 408, 410, 412) and restoring the set (414) of registers (406, 408, 410, 412) to some previous state. Restoring the set (414) of registers (406, 408, 410, 412) may be necessary given that instructions are fetched and loaded into registers prior to executing the instructions. Consider an example in which non-branching four instructions, $I_1$, $I_2$, $I_3$, and $I_4$ are to be executed sequentially. In such an example, each of the instructions and the operands used by each instruction may be fetched and loaded into the set (414) of registers (406, 408, 410, 412). If an event occurs that causes one or more of the instructions to not be executed, the registers that include the instructions that will not be executed, as well as the registers that include any operands for the instructions that will not be executed, will need to be restored to a previous state. For example, if an event occurs that causes instructions $I_3$ and $I_4$ to not be executed, the registers that include instructions $I_3$ and $I_4$ will need to be restored to a previous state. In addition, the registers that include any operands used by instructions $I_3$ and $I_4$ will need to be restored to a previous state. Readers will appreciate that the set (414) of registers (406, 408, 410, 412) that need to be restored to a previous state need not include all registers in the computer processor (404). Such a set (414) of registers (406, 408, 410, 412) can include a single register that needs to be restored, multiple registers (but not all registers) that need to be restored, or even all registers in the computer processor (404).

In the example method depicted in FIG. 4, determining (418) whether executing the non-branching instruction (402) will cause a flush may be carried out, for example, by determining whether the non-branching instruction (402) is a type of instruction whose execution is known to result in a flush. Examples of types of non-branching instructions whose execution are known to result in a flush can include system calls, returns from system calls, returns from interrupts, move from machine state register instructions, and so on. More specific examples can include POWERPC instructions such as a system call ('sc'), a system call vectored ('scv') instruction, a return from system call vectored ('rfscv') instruction, a return from interrupt doubleword ('rfid'), a hypervisor return from interrupt doubleword ('hrfid'), a move to machine state register ('mtmsr'), and others as will occur to those of skill in the art in view of the teachings of the present disclosure. Determining whether the instruction (402) is a type of non-branching instruction whose execution is known to result in a flush may be carried out, for example, by comparing an instruction code (e.g., an OP Code) contained in the non-branching instruction (402) to a list or other repository of instruction codes whose execution is known to result in a flush.

The example method depicted in FIG. 4 also includes, responsive to determining that executing the non-branching instruction (402) will (420) cause a flush, disabling (422) instruction fetching. Disabling (422) instruction fetching may be carried out, for example, by setting a bit or other flag that is monitored by an instruction fetch unit of the computer processor (404). The instruction fetch unit of the computer processor (404) may be configured such that when the value of the bit or flag is set to a first value, the instruction fetch unit can proceed with standard instruction fetching. The instruction fetch unit of the computer processor (404) may also be configured such that when the value of the bit or flag is set to a second value, the instruction fetch unit ceases to fetch instructions. As such, the instruction fetch unit of the computer processor (404) can essentially cease fetching operations in a situation where the fetched instructions will simply be flushed. If the computer processor (404) determines that executing the non-branching instruction (402) will not (434) cause a flush, however, the computer processor (404) may continue to process instructions normally (436) until the computer processor (404) ultimately receives an instruction that is known to cause a flush.

The example method depicted in FIG. 4 also includes recoding (424) the non-branching instruction (402) such that a recoded instruction (428) will be interpreted by an instruction fetch unit (400) as a branch instruction. The instruction fetch unit (400) depicted in FIG. 4 may be embodied as a module of automated computing machinery such as an integrated circuit that is configured for fetching instructions from an instruction cache or other form of computer memory. The instruction fetch unit (400) may be configured to fetch instructions by reading an address of an instruction to fetch from an instruction fetch address register ('IFAR').

In such an example, the instruction fetch unit (400) may provide the address contained in the IFAR to the instruction cache, which will subsequently return the instruction stored at the specified address.

In the example method depicted in FIG. 4, instructions that are to be executed by the computer processor (404) may include a collection of bits that are used to convey information about the instruction. The collection of bits may include one or more bits, for example, that are used by an instruction fetch unit (400) to determine whether a particular instruction is a branch instruction. Recoding (424) the non-branching instruction (402) such that the recoded instruction (428) will be interpreted as a branch instruction may be carried out, for example, by modifying the collection of bits in the recoded instruction (428) to values that are associated with a branch instruction. More specifically, the non-branching instruction (402) may be recoded (424) such that the recoded instruction (428) will be interpreted as an unconditional branch instruction, such as a branch to the count register instruction.

Readers will appreciate that by recoding (424) the non-branching instruction (402) such that a recoded instruction (428) will be interpreted as an unconditional branch instruction, all instructions that follow the non-branching instruction (402) will be invalidated, as would normally occur when encountering an unconditional branch instruction. Readers will further appreciate that all instructions that follow the non-branching instruction (402) will be invalidated by the same mechanism that is used by taken braches during normal processing, so that no additional hardware is needed.

In the example method depicted in FIG. 4, recoding (424) the non-branching instruction (402) such that a recoded instruction (428) will be interpreted by an instruction fetch unit (400) as a branch instruction can include inserting (426) an identifier (430) within the recoded instruction (428) that will be interpreted by the instruction fetch unit (400) as an instruction to cease instruction fetching. The identifier (430) within the recoded instruction (428) may be embodied, for example, as a predetermined bit within the recoded instruction (428) that is examined by the instruction fetch unit (400) to determine whether instruction fetching should be ceased. In such an example, the instruction fetch unit (400) may be configured such that, upon receiving a branch instruction, the instruction fetch unit (400) also checks the predetermined bit to determine whether the branch instruction includes a value in the predetermined bit that is intended to convey an instruction to cease instruction fetching to the instruction fetch unit (400).

Consider an example in which the non-branching instruction (402) is recoded to have the appearance of an unconditional branch to the count register instruction. In such an example, branch prediction logic within the computer processor (404) may re-direct the instruction fetch unit (400) by placing the address of the count register into the instruction fetch address register ('IFAR'). Because the count register would not contain an address of an instruction that needs to be fetched, if instruction fetching were left enabled, the instruction fetch unit (400) would subsequently attempt to fetch an instruction contained at an address specified in the count register. In order to avoid such fetching, however, the instruction fetch unit (400) may cease instruction fetching.

Readers will appreciate that the computer processor (404) depicted in FIG. 4 may operate by recoding branch instructions to optimize the execution of the branch instructions. Such recoding can include distilling control information for the branch instructions into a small number of bits. In fact, the control information for the branch instructions may be recoded such that two bits are used to identify the type of the branch instruction that is to be executed, and one additional bit may be used by the computer processor (404) to unconditionally predict that a branch will be taken. Furthermore, an additional bit may be utilized to designate a particular branch instruction as being an instruction that the computer processor (404) should interpret as an instruction to cease instruction fetching. In such a way, a non-branching instruction (402) that is identified as an instruction that will cause a flush can be recoded as a branch instruction that the computer processor (404) will unconditionally predict that a branch will be taken, but an additional bit will be set to a value that will cause the computer processor (404) to interpret the instruction as an instruction to cease instruction fetching. Readers will further appreciate that the four bits described above (i.e., the two bits used to convey the type of branch instruction, the bit used to convey whether the computer processor (404) should predict that a branch will be taken, and the bit used to convey whether the instruction is an instruction to cease instruction fetching) may be selected such that those particular bits are not used by any of the instructions that are known to cause a flush. In fact, since non-branching instruction (402) that is known to cause a flush is re-coded, the four bits described above may be moved around to facilitate this feature. Readers will further appreciate that the recoding described herein may occur only during a miss of an instruction cache or during a load of the instruction cache. That is, the recoding need not occur each time instructions are fetched, but only when the instructions are loaded into the instruction cache.

The example method depicted in FIG. 4 also includes executing (432) the recoded instruction (428). Readers will appreciate that although certain bits in the recoded instruction (428) may be set to values that would cause the instruction fetch unit (400) to interpret the recoded instruction (428) as a branch instruction, the remaining bits in the non-branching instruction (402) may be retained in their original form, such that an instruction execution unit may execute the recoded instruction (428) in the same way that it would have executed the non-branching instruction (402). Readers will appreciate that the instruction codes and the format of each instruction in an instruction set may be configured such that the bits that are used to indicate that a particular instruction is a branching instruction may be bits that are not used in the actual execution of one or more instructions that are known to cause a flush. In such a way, the recoded instruction (428) may be recoded in such a way as to essentially trick the instruction fetch unit (400) into interpreting the recoded instruction (428) as an unconditional branch (thereby causing instruction fetching to cease) but also enabling the remainder of the computer processor (404) (e.g., the processing units) to execute the recoded instruction (428) in the same way that it would have executed the non-branching instruction (402).

Figure 5:
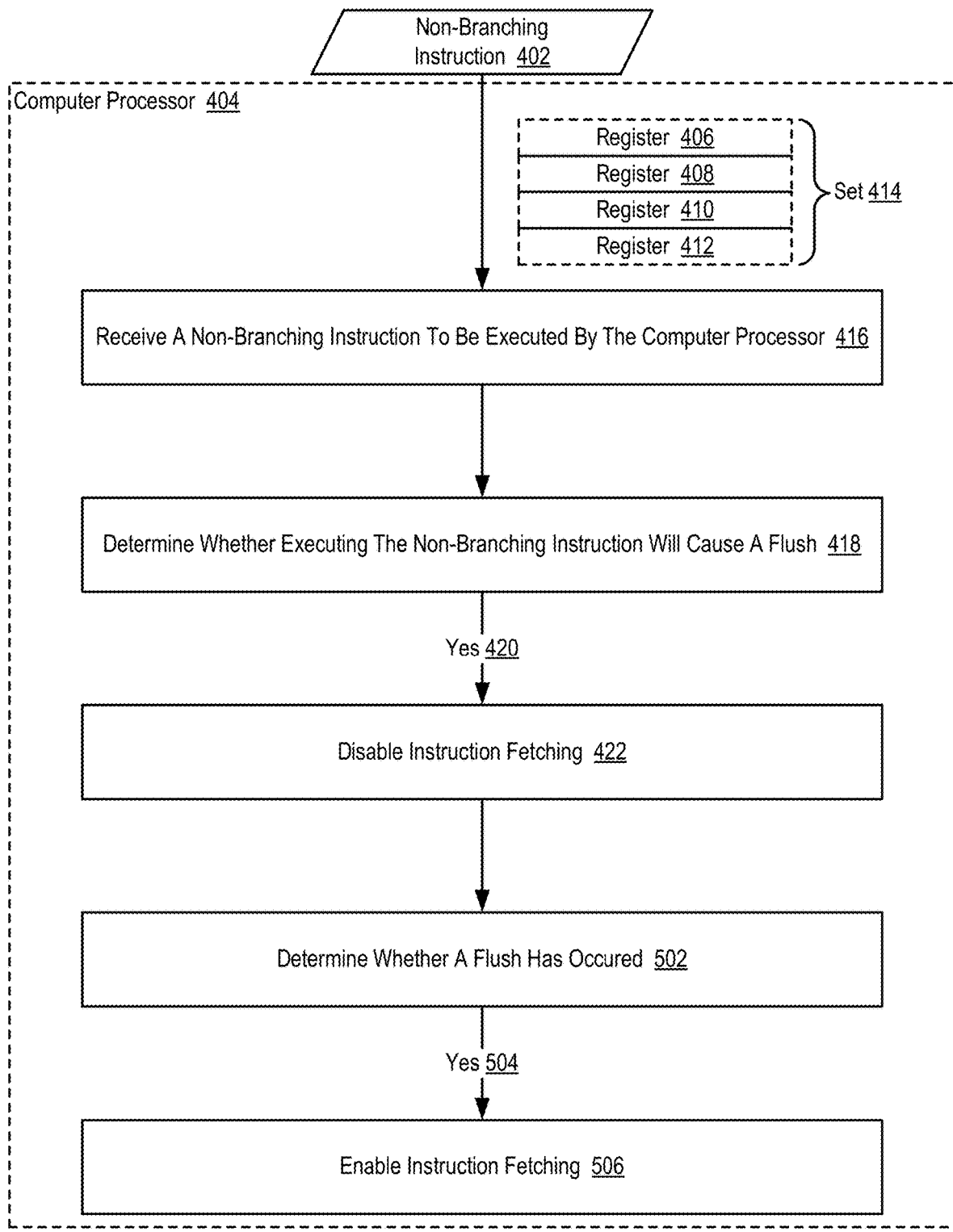
FIG. 5 sets forth a flow chart illustrating an additional example method for blocking instruction fetching in a computer processor according to embodiments of the present disclosure.

For further explanation, FIG. 5 sets forth a flow chart illustrating an additional example method for blocking instruction fetching in a computer processor according to embodiments of the present disclosure. The example method depicted in FIG. 5 is similar to the example method depicted in FIG. 4, as the example method depicted in FIG. 5 also includes receiving (416) a non-branching instruction (402) to be executed by the computer processor (404), determining (418) whether executing the non-branching instruction (402) will cause a flush, and disabling (422) instruction fetching in response to affirmatively (420) determining that executing the non-branching instruction (402) will cause a flush.

The example method depicted in FIG. 5 also includes determining (502) whether a flush has occurred. Determining (502) whether a flush has occurred may be carried out by determining whether a particular interrupt that triggers a flush has been received, by determining whether an instruction with an opcode that is associated with performing a flush has been executed, and so on. Readers will appreciate that the flush may occur as the result of the executing the non-branching instruction (402) that is known to cause a flush or as the result of executing an older instruction (i.e., an instruction that is older, from a program order perspective, than the non-branching instruction (402) that is known to cause a flush) that causes a flush to occur. As such, the computer processor (404) is only concerned with determining (502) whether any flush has occurred after instruction fetching was disabled (422). Furthermore, in some circumstances, the instruction that causes a flush to occur may still be executing (but not yet completed) at the point in time where the flush occurs.

The example method depicted in FIG. 5 also includes, responsive to affirmatively (504) determining that a flush has occurred, enabling (506) instruction fetching. Enabling (506) instruction fetching may be carried out, for example, by setting a bit or other flag that is monitored by an instruction fetch unit of the computer processor (404). The instruction fetch unit of the computer processor (404) may be configured such that when the value of the bit or flag is set to a first value, the instruction fetch unit can proceed with standard instruction fetching. The instruction fetch unit of the computer processor (404) may also be configured such that when the value of the bit or flag is set to a second value, the instruction fetch unit ceases to fetch instructions. As such, when the computer processor (404) has affirmatively (504) determined that a flush has occurred, the value of the bit or flag may be reset to the first value, such that the instruction fetch unit can proceed with standard instruction fetching.

Figure 6:
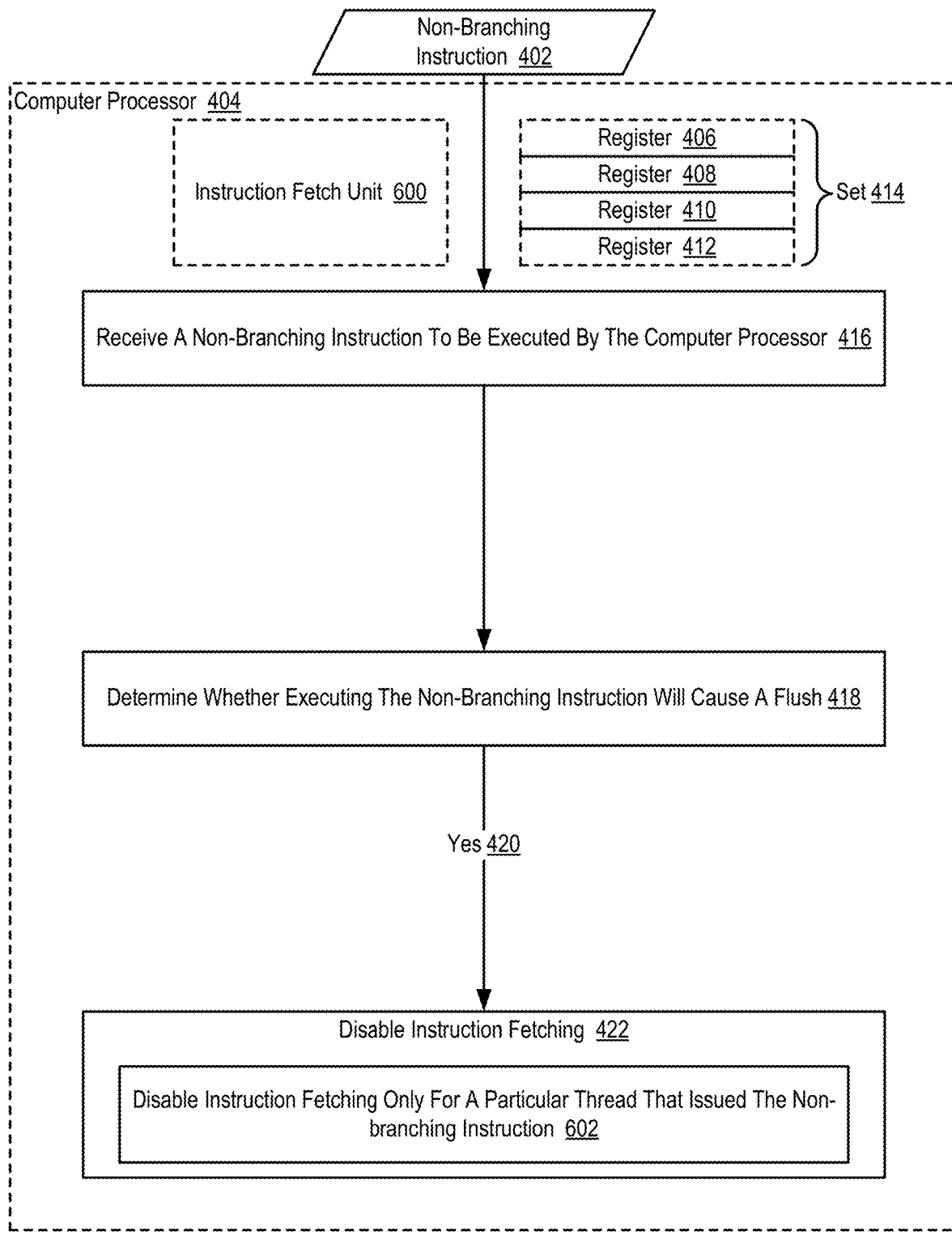
FIG. 6 sets forth a flow chart illustrating an additional example method for blocking instruction fetching in a computer processor according to embodiments of the present disclosure.

For further explanation, FIG. 6 sets forth a flow chart illustrating an additional example method for blocking instruction fetching in a computer processor according to embodiments of the present disclosure. The example method depicted in FIG. 6 is similar to the example method depicted in FIG. 4, as the example method depicted in FIG. 6 also includes receiving (416) a non-branching instruction (402) to be executed by the computer processor (404), determining (418) whether executing the non-branching instruction (402) will cause a flush, and disabling (422) instruction fetching in response to affirmatively (420) determining that executing the non-branching instruction (402) will cause the flush.

In the example method depicted in FIG. 6, disabling (422) instruction fetching can include disabling (602) instruction fetching only for a particular thread that issued the non-branching instruction (402). Disabling (602) instruction fetching only for a particular thread that issued the non-branching instruction (402) may be carried out in a variety of ways. Disabling (602) instruction fetching only for a particular thread that issued the non-branching instruction (402) may be carried, for example, by the instruction fetch unit (600) or some other logic within the computer processor (404) maintaining a table or other data structure that associates thread identifiers with a value indicating whether instruction fetching is enabled or disabled. Alternatively, in embodiments where the computer processor (404) is a multi-slice computer processor where each slice is executing a single thread, disabling (602) instruction fetching only for a particular thread that issued the non-branching instruction (402) may be carried out by disabling instruction fetching on the particular slice that is executing the particular thread.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of blocking instruction fetching in a computer processor, the method comprising:
    receiving a non-branching instruction to be executed by the computer processor;
    determining, at pre-decode, whether executing the non-branching instruction will cause a flush; and
    responsive to determining that executing the non-branching instruction will cause a flush, disabling instruction fetching, including recoding the non-branching instruction by:
        modifying a collection of bits in the non-branching instruction to values associated with a branch instruction, such that the recoded non-branching instruction will be identified by an instruction fetch unit as an unconditional branch instruction; and
        inserting an identifier within the recoded non-branching instruction that will be identified by the instruction fetch unit as an instruction to cease instruction fetching, wherein the identifier comprises a predetermined bit within the recoded instruction that is examined by the instruction fetch unit to determine whether instruction fetching should be ceased.

2. The method of claim 1 further comprising:
    determining whether a flush has occurred; and
    responsive to determining that the flush has occurred, enabling instruction fetching.

3. The method of claim 1 further comprising executing the recoded non-branching instruction.

4. The method of claim 1 wherein disabling instruction fetching further comprises disabling instruction fetching only for a particular thread that issued the non-branching instruction.

5. The method of claim 1 wherein recoding the non-branching instruction occurs during a miss of an instruction cache or during a load of an instruction cache.

6. A computer processor configured for:
    receiving a non-branching instruction to be executed by the computer processor;
    determining, at pre-decode, whether executing the non-branching instruction will cause a flush; and
    responsive to determining that executing the non-branching instruction will cause a flush, disabling instruction fetching, including recoding the non-branching instruction by:
        modifying a collection of bits in the non-branching instruction to values associated with a branch instruction, such that the recoded non-branching instruction will be identified by an instruction fetch unit as an unconditional branch instruction; and
        inserting an identifier within the recoded non-branching instruction that will be identified by the instruction fetch unit as an instruction to cease instruction fetching, wherein the identifier comprises a predetermined bit within the recoded instruction that is examined by the instruction fetch unit to determine whether instruction fetching should be ceased.

7. The computer processor of 7 further configured for:
    determining whether a flush has occurred; and
    responsive to determining that the flush has occurred, enabling instruction fetching.

8. The computer processor of 7 further configured for executing the recoded non-branching instruction.

9. The computer processor of 7 wherein disabling instruction fetching further comprises disabling instruction fetching only for a particular thread that issued the non-branching instruction.

10. The computer processor of 6 wherein recoding the non-branching instruction occurs during a miss of an instruction cache or during a load of an instruction cache.

11. A computing system that includes a computer processor and computer memory, the computer processor configured for:
    receiving a non-branching instruction to be executed by the computer processor;
    determining, at pre-decode, whether executing the non-branching instruction will cause a flush; and
    responsive to determining that executing the non-branching instruction will cause a flush, disabling instruction fetching, including recoding the non-branching instruction by:
        modifying a collection of bits in the non-branching instruction to values associated with a branch instruction, such that the recoded non-branching instruction will be identified by an instruction fetch unit as an unconditional branch instruction; and
        inserting an identifier within the recoded non-branching instruction that will be identified by the instruction fetch unit as an instruction to cease instruction fetching, wherein the identifier comprises a predetermined bit within the recoded instruction that is examined by the instruction fetch unit to determine whether instruction fetching should be ceased.

12. The computing system of claim 11 wherein the computer processor is further configured for:
    determining whether a flush has occurred; and
    responsive to determining that the flush has occurred, enabling instruction fetching.

13. The computing system of claim 11 wherein the computer processor is further configured for executing the recoded non-branching instruction.

14. The computing system of claim 11 wherein disabling instruction fetching further comprises disabling instruction fetching only for a particular thread that issued the non-branching instruction.

15. The computing system of claim 11 wherein recoding the non-branching instruction occurs during a miss of an instruction cache or during a load of an instruction cache.

* * * * *